United States Patent
Hathorn et al.

(10) Patent No.: US 11,206,144 B2
(45) Date of Patent: Dec. 21, 2021

(54) ESTABLISHING A SECURITY ASSOCIATION AND AUTHENTICATION TO SECURE COMMUNICATION BETWEEN AN INITIATOR AND A RESPONDER

(71) Applicant: INTERNATIONAL BUSINESS MACHINES CORPORATION, Armonk, NY (US)

(72) Inventors: Roger G. Hathorn, Tucson, AZ (US); Patricia G. Driever, Poughkeepsie, NY (US); Christopher J. Colonna, Ossining, NY (US); Mooheng Zee, Fishkill, NY (US); Mikel William Welsh, Tucson, AZ (US); Richard Mark Sczepczenski, Hyde Park, NY (US); John R. Flanagan, Chape Hilll, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 16/568,176

(22) Filed: Sep. 11, 2019

(65) Prior Publication Data

US 2021/0075627 A1    Mar. 11, 2021

(51) Int. Cl.
*H04L 29/06* (2006.01)
*H04L 9/32* (2006.01)
*H04L 9/08* (2006.01)

(52) U.S. Cl.
CPC .......... *H04L 9/3273* (2013.01); *H04L 9/0891* (2013.01); *H04L 9/3242* (2013.01); *H04L 9/3297* (2013.01)

(58) Field of Classification Search
None
See application file for complete search history.

(56) References Cited

U.S. PATENT DOCUMENTS 6,219,771 B1    4/2001    Kikuchi et al.
6,832,313 B1    12/2004   Parker
(Continued)

FOREIGN PATENT DOCUMENTS

CN    1980451 A      6/2007
CN    101119196 A    2/2008
(Continued)

OTHER PUBLICATIONS

Sumathy, S.; Kumar, B. Upendra. Secure Key Exchange and Encryption Mechanism for Ad Hoc Networks. 2009 First International Conference on Networks & Communications. https://ieeexplore.ieee.org/stamp/stamp.jsp?tp=&arnumber=5384027 (Year: 2009).*
(Continued)

*Primary Examiner* — Jeremiah L Avery
(74) *Attorney, Agent, or Firm* — Konrad Raynes Davda & Victor LLP; David W. Victor (57) ABSTRACT

Provided are a computer program product, system and method embodiments for secure communication between an initiator and a responder over a network. The responder receives, from the initiator, a security association initialization message to establish a security association with the responder including key material used to generate a key for the security association. The responder receives an authentication message from the initiator to program the responder to establish authentication between the responder and the initiator after establishing the security association. The responder sends an authentication message response to the initiator to establish authentication with the responder in response to the authentication message. The responder sends an authentication done message to the initiator after sending the authentication message response to cause the initiator to activate using the security association and the key to encrypt
(Continued)

and decrypt communication between the responder and initiator.

25 Claims, 7 Drawing Sheets

(56) References Cited

U.S. PATENT DOCUMENTS

| | | | |
|---|---|---|---|
| 6,915,437 | B2 | 7/2005 | Swander et al. |
| 7,028,183 | B2 | 4/2006 | Simon et al. |
| 7,234,063 | B1 | 6/2007 | Baugher et al. |
| 7,500,102 | B2 | 3/2009 | Swander et al. |
| 7,565,537 | B2 | 7/2009 | Morais et al. |
| 7,590,843 | B1 | 9/2009 | Khalil et al. |
| 8,250,625 | B2 | 8/2012 | Risley |
| 8,275,950 | B2 | 9/2012 | Sanada et al. |
| 8,327,129 | B2 | 12/2012 | Ren et al. |
| 8,479,266 | B1 | 7/2013 | Delker et al. |
| 8,504,823 | B2 | 8/2013 | Carpenter et al. |
| 8,649,768 | B1 | 2/2014 | Gaddam et al. |
| 8,667,151 | B2 | 3/2014 | Mizikovsky et al. |
| 8,769,288 | B2 | 7/2014 | Sundaram et al. |
| 8,787,572 | B1* | 7/2014 | Tewari .............. H04L 9/3226 380/255 |
| 8,799,436 | B2 | 8/2014 | Ayachitula et al. |
| 8,844,025 | B2 | 9/2014 | Russo et al. |
| 9,043,883 | B2 | 5/2015 | Touve et al. |
| 9,058,191 | B2 | 6/2015 | Gupta et al. |
| 9,143,937 | B2 | 9/2015 | Cherian et al. |
| 9,246,898 | B2 | 1/2016 | McKeeman et al. |
| 9,882,713 | B1 | 1/2018 | Raza et al. |
| 10,033,702 | B2 | 7/2018 | Ford et al. |
| 10,324,507 | B2 | 6/2019 | Mullins et al. |
| 2004/0107342 | A1 | 6/2004 | Pham et al. |
| 2005/0063352 | A1* | 3/2005 | Amara .............. H04L 63/0823 370/338 |
| 2005/0108531 | A1 | 5/2005 | Swander et al. |
| 2006/0104308 | A1* | 5/2006 | Pinkerton .............. H04L 69/32 370/469 |
| 2010/0154053 | A1 | 6/2010 | Dodgson et al. |
| 2011/0252231 | A1 | 10/2011 | Mishra |
| 2012/0036363 | A1 | 2/2012 | Langham et al. |
| 2012/0129492 | A1* | 5/2012 | Mechaley, Jr. ....... G06Q 20/385 455/411 |
| 2013/0003975 | A1* | 1/2013 | Fukuda .............. H04L 63/061 380/273 |
| 2015/0350906 | A1 | 12/2015 | Patil et al. |
| 2016/0139845 | A1 | 5/2016 | Muhlestein et al. |
| 2016/0309379 | A1* | 10/2016 | Pelletier .............. H04W 76/12 |
| 2016/0342798 | A1 | 11/2016 | Smith et al. |
| 2016/0378691 | A1 | 12/2016 | Sherman |
| 2017/0124356 | A1* | 5/2017 | Allyn .............. H04L 9/30 |
| 2018/0367516 | A1 | 12/2018 | Mundra et al. |
| 2019/0116052 | A1 | 4/2019 | Kim et al. |
| 2019/0213104 | A1 | 7/2019 | Qadri et al. |
| 2019/0251282 | A1 | 8/2019 | Patel et al. |

FOREIGN PATENT DOCUMENTS

| | | |
|---|---|---|
| CN | 101911742 A | 12/2010 |
| CN | 102063583 A | 5/2011 |
| CN | 103425916 A | 12/2013 |
| CN | 209057241 | 7/2019 |
| EP | 1276034 A2 | 1/2003 |
| EP | 1657878 A1 | 5/2006 |
| EP | 2763442 B1 | 10/2019 |
| KR | 101552950 B1 | 9/2015 |
| WO | 2018167539 A1 | 9/2018 |
| WO | 2018226265 A1 | 12/2018 |

OTHER PUBLICATIONS

Ouyang, Yen-Chieh et al. A new security key exchange channel for 802.11 WLANs. IEEE 37th Annual 2003 International Carnahan Conference onSecurity Technology, 2003. Proceedings, https://ieeexplore.ieee.org/stamp/stamp.jsp?tp=&arnumber=1297562 (Year : 2003).*
Lee, Byung-Gil et al. Concatenated wireless roaming security association and authentication protocol using ID-based cryptography. The 57th IEEE Semiannual Vehicular Technology Conference, 2003. VTC 2003-Spring.https://ieeexplore.ieee.org/stamp/stamp.jsp?tp=&arnumber=1207072 (Year: 2003).*
Zhao, Xin et al. A Novel Authentication and Key Agreement Scheme for Wireless Mesh Networks. 2009 Fifth International Joint Conference on Inc, IMS and IDC. https://ieeexplore.IEEE.org/stamp/stamp.jsp?tp=&arnumber=5331675 (Year: 2009).*
Fereidooni, H. et al. A New Authentication and Key Exchange Protocol for Insecure Networks. 2009 5th International Conference on Wireless Communications, Networking and Mobile Computing. https://ieeexplore.IEEE.org/stamp/stamp.jsp?tp=&arnumber=5302478 (Year: 2009).*
Abirami, E.; Padmavathy, T. Proficient key management scheme for multicast groups using group key agreement and broadcast encryption. 2017 International Conference on Information Communication and Embedded Systems (ICICES). https://ieeexplore.IEEE.org/stamp/stamp.jsp?tp=&arnumber=8070789 (Year: 2017).*
Transmittal of Information On Confidential Activities dated Feb. 21, 2020, pp. 1.
C. Kaufman, et al., "Internet Key Exchange Protocol Version2 (IKEv2)Internet Engineering Task Force (IETF)", Oct. 31, 2014, pp. 285.
PCT International Search Report and Written Opinion, dated Dec. 16, 2020, pp. 9, for Serial No. PCT IB2020/058331.
"Amazon Web Services: Overview of Security Processes", Amazon, 2018, pp. 95.
"Introduction to AWS Security Processes", Amazon, Jun. 2016, pp. 45.
M.K. Sah, et al., "Security and Concurrency Control in Distributed Database System", International Journal of scientific research and management, vol. 2, Issue 12, pp. 1839-1845, 2017.
Anonymous, "Cognitive Storage Subsystem Secure Volumes", IP.com, IP.com No. IPCOM000253178D, Mar. 12, 2018, pp. 4.
Anonymous, "Methodology and Procedure for Secure Granular Authorization and Audit Implementation in Distributed Enterprise Computing Environment", IP.com, IP.com No. IPCOM000237293D, Jun. 11, 2014, pp. 18.
Anonymous, "A Method and System for Providing High Transaction Rate Authentication using Multiple Secondary Real Time Authentication Parameters", IP.com, IP.com No. IPCOM000229944D, Aug. 8, 2013, pp. 2.
Anonymous, "System for Optimizing Authentication in a Multi-Threaded Environment", IP.com, IP.com No. IPCOM000223083D, Nov. 1, 2012, pp. 4.
"Storage device and system with authentication mechanism", IP.com, IP.com No. IPCOM000225630D, Feb. 22, 2013, pp. 4.
Anonymous, "Method for Flexible and Diverse Error Handling for Storage Devices", IP.com, IP.com No. IPCOM000233966D, Jan. 6, 2014, pp. 7.
Anonymous, "Method and Apparatus for Authentication in Storage Systems using QR code", IP.com, IP.com No. IPCOM000255722D, Oct. 11, 2018, pp. 6.
Anonymous, "Port Based Network Security for communication networks in a gaming environment", IP.com, IP.com No. IPCOM000166456D, Jan. 11, 2008, pp. 3.
IBM, "Automation of authentication with use of internal and external key parameters", IP.com, IP.com No. IPCOM000180832D, Mar. 18, 2009, pp. 5.
Anonymous, "Provide Java APIs into the IUCV protocol", IP.com, IP.com No. IPCOM000244583D, Dec. 23, 2015, pp. 4.
Wale Amol, D., & Rastogi, V. Data Integrity Auditing of Cloud Storage. International Journal of Computer Applications, Jan. 2016, pp. 5.
A. Vasudevan, et al., "Lockdown: Towards a safe and practical architecture for security applications on commodity platforms", In (56) References Cited

OTHER PUBLICATIONS

International Conference on Trust and Trustworthy Computing (pp. 34-54). Springer, Berlin, Heidelberg, Jun. 2012.
J.K. Resch, et al. "AONT-RS: Blending Security and Performance in Dispersed Storage Systems", 2017, pp. 12.
A. Buecker, et al. "Reduce Risk and Improve Security on IBM Mainframes: vol. 3 Mainframe Subsystem and Application Security", IBM Corporation, Redbooks, Document No. SG24-8196-00, Nov. 2015, pp. 200.
F.Majstor, Storage Area Networks Security Protocols and Mechanisms', Apr. 2004, pp. 21.
M. Lippett, et al., "Networked Storage Concepts and Protocols", EMC2 Techbooks, EMC Corporation, 2008, pp. 370.
J.Tate, et al., "IBM SAN Survival Guide", IBM Corporation, Redbooks, Document No. SG24-6143-01, Aug. 2003, pp. 662.
"Storage Security: Fibre Channel Security", SNIA, Technical White Paper, Version 1, May 2016, pp. 29.
"Fibre Channel Framing and Signaling—5", INCITS, INCITS working draft proposed American National Standard for Information Technology, Apr. 3, 2018, pp. 506.
"Fibre Channel Link Services Rev 4.04", INCITS, INCITS working draft proposed American National Standard for Information Technology, Jul. 16, 2019, pp. 238.
"Fibre Channel Security Protocols—2", INCITS, INCITS working draft proposed American National Standard for Information Technology, Jun. 12, 2012, pp. 312.
B. Aboba, et al. "Securing Block Storage Protocols over IP", The Internet Society, Apr. 2004, [online][retrieved Aug. 26, 2019] https://tools.ietf.org/html/rfc3723, pp. 70.
"Information Technology Fibre Channel Part 432: Security Protocols—2", ISO/IEC, pp. 312.
"Understanding FC (and FCoE) fabric configuration in 5 minutes or less", STEVENU, Mar. 20, 2012, pp. 8, [online] [retrieved Aug. 26, 2019] https://blog.osnexus.com/2012/03/20/understanding-fc-fabric-configurati . . . .
Anonymous, "USB Trust Extensions for secured USB devices", IP.com, IP.com No. IPCOM000245301D, Feb. 26, 2016, pp. 8.
"Dell EMC PowerMax Reliability, Availability, and Serviceability Technical White Paper", Dell EMC, Oct. 2018, pp. 32.
"vSphere Security", VMWare, Inc., 2009, pp. 258.
U.S. Appl. No. 16/583,173, filed Sep. 25, 2019, (18.891).
U.S. Appl. No. 16/568,117, filed Sep. 11, 2019, (18.892).
U.S. Appl. No. 16/583,178, filed Sep. 25, 2019, (18.893).
U.S. Appl. No. 16/568,160, filed Sep. 11, 2019, (18.894).
U.S. Appl. No. 16/568,124, filed Sep. 11, 2019, (18.895).
U.S. Appl. No. 16/568,131, filed Sep. 11, 2019, (18.896).
U.S. Appl. No. 16/568,174 filed Sep. 11, 2019, (18.897).
English machine translation for CN209057241 dated Dec. 4, 2013, pp. 6.
English machine translation for CN103425916 dated Dec. 4, 2013, pp. 12.
English machine translation of CN102063583 dated May 18, 2011, pp. 20.
English machine translation for KR101552950 dated Sep. 14, 2015, pp. 16.
List of IBM Patents and Applications Treated as Related, dated Oct. 21, 2019, pp. 2.
H. Fereidooni, et al., "A New Authentication and Key Exchange Protocol for Insecure Networks", 5th International Conference on Wireless Communications, Networking and Mobile Computing, 2009, pp. 4, https///ieeexplore.ieee.org/stamp/stamp.jsptp=arnumber=5302478.
S. Hossain, et al., "Generation of One-Time Keys for SingleLine Authentication", 14th Annual Conference on Privacy Security and Trust (PST) 2016, pp. 4, https//ieeexplore.ieee.org/stamp//stamp.jsptp= arnumber=7906957.
K. Kaur, et al., "Adaptive Random Key Scheme for Authentication and Key Agreement (ARKS-AKA) for Efficient LTE Security", 2nd International Conference on Recent Advances in Engineering Computational Sciences (RECS), 2015, pp. 6, https//ieeexplore.ieee.org/stamp//stamp.jsptp= arnumber=7453422.
Notice of Allowance dated Sep. 3, 2021, pp. 29, for U.S. Appl. No. 16/568,174.
PCT International Search Report and Written Opinion dated Dec. 16, 2020, p. 9, for Serial No. PCTIB2020/058331.
PCT International Search Report and Written Opinion, dated Dec. 16, 2020, p. 9, for Serial No. PCT IB2020/058326.
X. Zhao, et al., "A Novel Authentication and Key Agreement Scheme for Wireless Mesh Networks", 2009 Fifth International Joint Conference on INC, IMS and IDC., 2009, p. 4, https://ieeexplore.IEEE.org/stamp/stamp.jsp?tp=&arnumber=5331675.
T. Cheneau, et al., "A Trustful Authentication and Key Exchange Schemes (TAKES) for Ad Hoc Netowrks", 2011 5th International Conference on Network System Security, 2011, p. 5, https://ieeexplore.IEEE.org/stamp/stamp.jsp?tp=&arnumber=6060009.
Notice of Allowance dated Oct. 5, 2021, pp. 15, for U.S. Appl. No. 16/568,174.

* cited by examiner

Security Association

ESTABLISHING A SECURITY ASSOCIATION AND AUTHENTICATION TO SECURE COMMUNICATION BETWEEN AN INITIATOR AND A RESPONDER

BACKGROUND OF THE INVENTION

1. Field of the Invention

The present invention relates to a computer program product, system, and method for establishing a security association and authentication to secure communication between an initiator and a responder.

2. Description of the Related Art

In a Fibre Channel environment, to provide for secure and encrypted communication between nodes in a Fabric, a Security Association (SA) management transaction occurs between an SA Initiator and an SA Responder using a security establishment protocol. The security association management protocol may be initiated by an authentication responder of the Fibre Channel authentication protocol. The initiator and responders may comprise ports in host bus adaptors in devices in a Fibre Channel network. Separate security associations are established for data transmission and data reception at a port. Completion of the SA establishment transaction results in a set of security associations and related key material used to encrypt/decrypt data communication between the initiator and the target under the established security association.

The cryptographic keys used to secure data in the security association for transmission and reception may be refreshed periodically as part of a rekey operation, which involves repeating the security establishment protocol and reauthentication. An example of a security association protocol is the Security Association Management protocol in the T11 Fibre Channel Security Protocol Standard FC-SP-2, which is similar to protocols defined by internet protocol standards such as Internet Key Exchange version 2 (IKEv2). The protocol consists of a pair of messages, SA_Init and SA_Init Response to establish a parent association followed by a pair of messages, SA_Auth and SA_Auth Response to perform authentication of the entitles and establish the Security Associations that protect the data transferred between the entitles.

When using re-authentication to perform a rekey operation, multiple security associations are maintained at the initiator and target until the old security association is deleted. In certain implementations, to avoid traffic loss during this time, transmission of data using the new security association is delayed until sometime after reception of a delete request from the responder. If errors occur in the messaging to establish the new security associations, inconsistent states and traffic loss may result.

There is a need in the art for improved techniques for establishing security associations for transmission of data between nodes.

SUMMARY

Provided are a computer program product, system and method embodiments for secure communication between an initiator and a responder over a network. The responder receives, from the initiator, a security association initialization message to establish a security association with the responder including key material used to generate a key for the security association. The responder receives an authentication message from the initiator to program the responder to establish authentication between the responder and the initiator after establishing the security association. The responder sends an authentication message response to the initiator to establish authentication with the responder in response to the authentication message. The responder sends an authentication done message to the initiator after sending the authentication message response to cause the initiator to activate using the security association and the key to encrypt and decrypt communication between the responder and initiator.

The above embodiments avoids inconsistent states due to errors when establishing a security association and authentication of nodes by having the responder send an authentication done message to confirm to the initiator that the responder has successfully completed authentication and has activated the new security association for immediate use, which causes the initiator to activate the security association. This allows the initiator to begin using the new security association for transmission upon the receipt of the authentication done message from the responder because the initiator is assured by the authentication done message that the responder has successfully completed authentication and activated the new security association message.

Further provided are a computer program product, system and method embodiments for secure communication between an initiator and a responder over a network and to perform a rekey operation. The responder maintains a first security association with the initiator having a first key to use to encrypt and decrypt messages transmitted with the initiator. The responder performs a rekey operation to establish a second security association with the initiator using a second key and queues Input/Output (I/O) for transmission using the second key after completing the rekey operation. In response to activating the second security association to use for transmission, the responder starts an invalidate timer. Both the first and the second keys can be used for transmissions with the initiator before the invalidate timer expires after starting. The responder invalidates the first security association in response to expiration of the invalidate timer.

With the above embodiments, the responder may initiate a rekey operation to generate a second security association for use at the responder. After activating the second security association, the responder starts an invalidate timer to wait before invalidating the first security association to provide time to flush I/O secured using the first security association, so that both the first and second keys can be used during the invalidate timer. Thus, when the responder invalidates the first security association after the invalidate timer expires, the responder is assured that the first security association is not needed for any pending transmissions in the system.

The subject matter of the embodiments may optionally include an optional embodiment of receiving an accept message from the initiator in response to the authentication done message. The security association and generated key for the security association are activated to use for communication before sending the authentication done message. The authentication is established between the initiator and the responder in response to receiving the accept message.

With the above optional embodiment, the security association and authentication are coordinated by having the responder receive an accept message from the initiator to the authentication done message to signal to the responder that both initiator and responder have activated the security association for use and the security association may be used now for further transmissions.

The subject matter of the above embodiments may optionally include an optional embodiment that the accept message comprises a second accept message. The responder receives a first accept message from the initiator in response to the authentication message response. The responder activates the security association to use a key for the security association to encrypt and decrypt messages for the initiator in response to the first accept message. The authentication done message is sent after receiving the first accept message.

With the above optional embodiment, after authentication is complete, the responder, in response to an authentication response message, receives from the initiator first accept message to cause the responder to activate the security association, and then the responder signals it has activated the security association through the authentication done message following the first accept message. This allows coordination between the initiator and responder as to when both have activated the security association.

The subject matter of the above embodiments may optionally include an optional embodiment that the initiator comprises a host system and the responder comprises a storage controller providing the host system access to storage resources. The security association and authentication are established for an initiator port at the host system and a responder port at the storage controller.

With the above optional embodiment, the host may implement the initiator to establish the security association with a port at a storage controller. Having the host function as the initiator in establishing a security association with a storage controller avoid having to negotiate between nodes the node that will function as the initiator.

The subject matter of the above embodiments may optionally include an optional embodiment for the rekey operation that the responder receives a security association initialization message from the initiator to accept the second security association, including key material used to generate the second key for the second security association. The responder receives an authentication message from the initiator to establish authentication between the responder and the initiator after the security association initialization message. The responder sends an authentication response message to the initiator after authenticating the initiator in response to the authentication message.

With the above optional embodiment, the initiator coordinates when it starts the invalidate timer to invalidate the first security association at a point the responder sends the authentication done message to signal that authentication has completed and the second key has been activated for use.

DETAILED DESCRIPTION

Described embodiments provide improvements to computer technology for establishing a security association between an initiator and responder in a network. Described embodiments avoid inconsistent states due to errors when establishing a security association and authentication of nodes by having the responder node send a final authentication done message to the initiator. The responder sends the authentication done message to confirm to the initiator that the responder has successfully completed authentication and has activated the new security association for immediate use. This allows the responder to begin using the new security association for transmission upon the completion of the security association management transaction rather than waiting to delete the old security association. In described embodiments, the old security association is maintained for reception of data for a period of time after the new security association is established for those messages coded with the key for the old security association. The delay is of sufficient length to allow all messages coded with the old security to be flushed from the system before deleting the old security association. This eliminates any potential issues with loss, as messages encrypted (secured) with the old security association cannot be processed (decrypted) once the old security association is removed.

Figure 1:
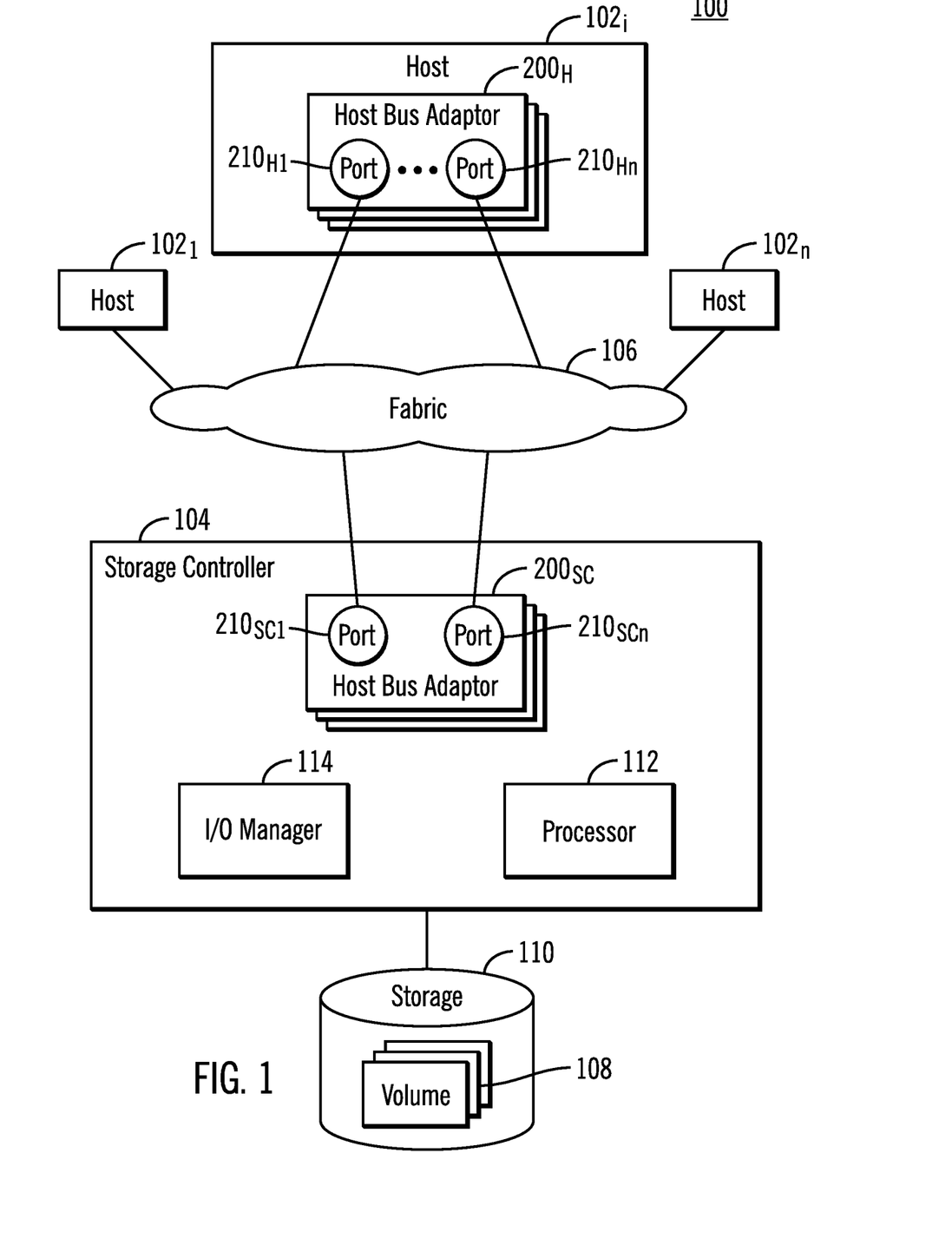
FIG. 1 illustrates an embodiment of a network computing environment.

FIG. 1 illustrates an embodiment of a network computing environment 100 in which a plurality of hosts $102_1$, $102_2 \ldots 102_n$ may submit Input/Output (I/O) requests to a storage controller 104 over a fabric (network) 106 to access data at volumes 108 (e.g., Logical Unit Numbers, Logical Devices, Logical Subsystems, etc.) in a storage 110. The storage controller 104 includes one or more processors 112 and an I/O manager 114 for managing the transfer of tracks transferred between the hosts $102_1$, $102_2 \ldots 102_n$ and the storage. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

Each of the hosts, as shown with respect to host $102_i$ have one or more host bus adaptors (HBAs) $200_H$ having a plurality of ports $210_{H1} \ldots 210_{Hn}$ to connect to a fabric 106 of switches. The storage controller 140 includes one or more host bus adaptors (HBAs) $200_{SC}$ having a plurality of ports $210_{SC1} \ldots 210_{SC\,n}$ to connect to the fabric 106 of switches. Alternatively, host ports $210_{Hi}$ and storage controller ports $210_{SC\,i}$ may connect directly via cable.

In one embodiment, the fabric 106 may comprise a Storage Area Network (SAN) comprising implemented with a Fibre Channel topology. The $210_{H1}$, $210_{SCi}$ may comprise Fibre Channel nodes that connect to Fibre Channel switches in the fabric 106. In alternative embodiments, the fabric 106 may comprise other types of networks, such as a Local Area Network (LAN), a Wide Area Network (WAN), the Internet, and Intranet, etc. Alternatively, the hosts $102_1, 102_2 \ldots 102_n$ may connect to the storage controller 104 over a bus interface, such as a Peripheral Component Interconnect (PCI) bus interface and other interfaces known in the art.

In described embodiments, the messaging between an initiator port and responder port are described with respect to the Fibre Channel protocol. In alternative embodiments, alternative network protocols may be used for transmitting messages between an initiator node that initiates establishment of a new security association and authentication and a responder node that responds to the request to establish a new security association and authentication for a pair of ports.

An initiator as that term is used herein refers to any device involved in initiating establishment of a security association and authentication with a responder, which refers to any device involved in responding to the establishment of the security association and authentication initiated by the initiator to provide secure communication between the initiator and the responder. The elements that function as the initiator and responder may be referred to as an initiator and responder, which may also be referred to as initiator port and responder port, initiator node and responder node, initiator HBA and responder HBA, as source node for the initiator and target node for the responder, as host port for the initiator and storage controller port for the responder, etc.

The fabric controller 202 and security association manager 206 may comprise program code loaded into a memory and executed by one or more processors. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

Figure 2:
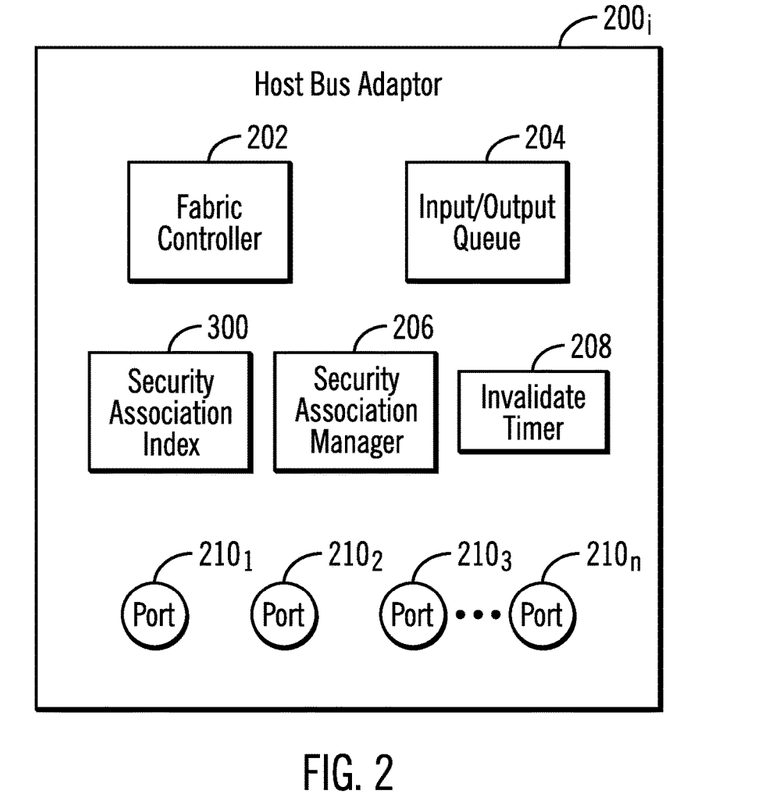
FIG. 2 illustrates an embodiment of a host bus adaptor.

FIG. 2 illustrates an embodiment of a host bus adaptor (HBA) $200_i$, such as a host HBA $200_H$ and storage controller HBA $200_{SC}$. The HBA $200_i$ includes a fabric controller 202 implementing a fabric protocol, such as the Fibre Channel protocol or other network protocols known in the art, to initialize and authenticate connections and manage I/O operations; an I/O queue 204 to queue I/O requests to send or receive with respect to other HBA ports on other devices; a security association index 300 having initialized security associations providing keys to encrypt and decrypt data from another fabric port; a security association manager 206 to negotiate and establish a security association $300_i$ with another node port in the fabric 106, wherein one port at one node functions as an initiator to communicate with a port on another node functioning as a responder; and an invalidate timer 208 used to determine when to invalidate a previous security association after performing a rekey operation to establish a new security association and new key to use for encryption/decryption. The HBA $200_i$ includes one or more ports $210_1 \ldots 210_n$ that may function as initiator or responder ports to communicate on the fabric 106.

The security association manager 206 may also implement an authentication protocol to authenticate the identity of an initiator and responder to each other as part of establishing the security association for a security association pair between an initiator port and responder port. In certain embodiments, after the security association exchange has completed, authentication messages may be exchanged to authenticate the initiator port and responder port and exchange identifies. For purposes of describing establishing a security association and authentication between an initiator port and a responder port, reference is made to initiator port $118_I$ in the host HBA $200_H$ and a responder port $122_R$ in the storage controller HBA $200_{SC}$. In further embodiments, the initiator and responder ports may be implemented in other types of devices that communicate over a fabric 106.

Figure 3:
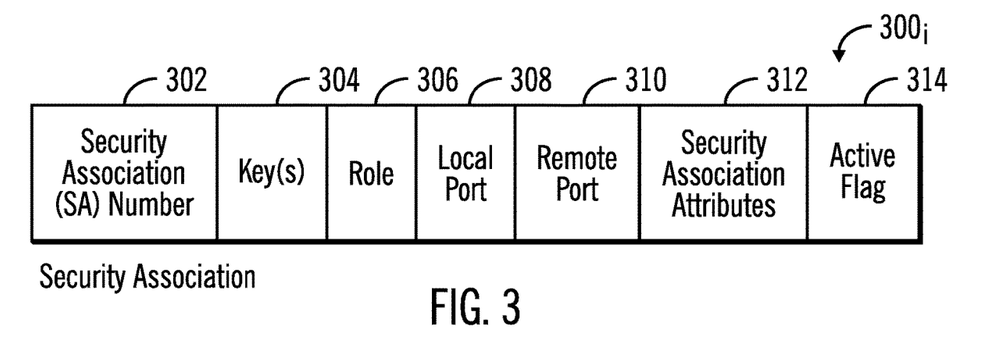
FIG. 3 illustrates an embodiment of a security association.

FIG. 3 illustrates an embodiment of an instance of a security association $300_i$ in the security association index 300, and includes a security association (SA) number 302; one or more keys 304 used to encrypt and decrypt messages with another node; a role 306 indicating whether a local port 308 involved in the security association is an initiator or responder; a remote port 310 at another device involved in the security association 302 that is subject to secure transmission with the local port 308; security association attributes 312, such as transform type used to encrypt/decrypt messages, transform attributes, nonces, and key material used to seed and generate the key; and an active flag 314 indicating whether the security association $300_i$ is actively being used to encrypt and decrypt messages. Messages would indicate the security association number 302 in the header of the security association used to encrypt and decrypt a message.

Figure 4:
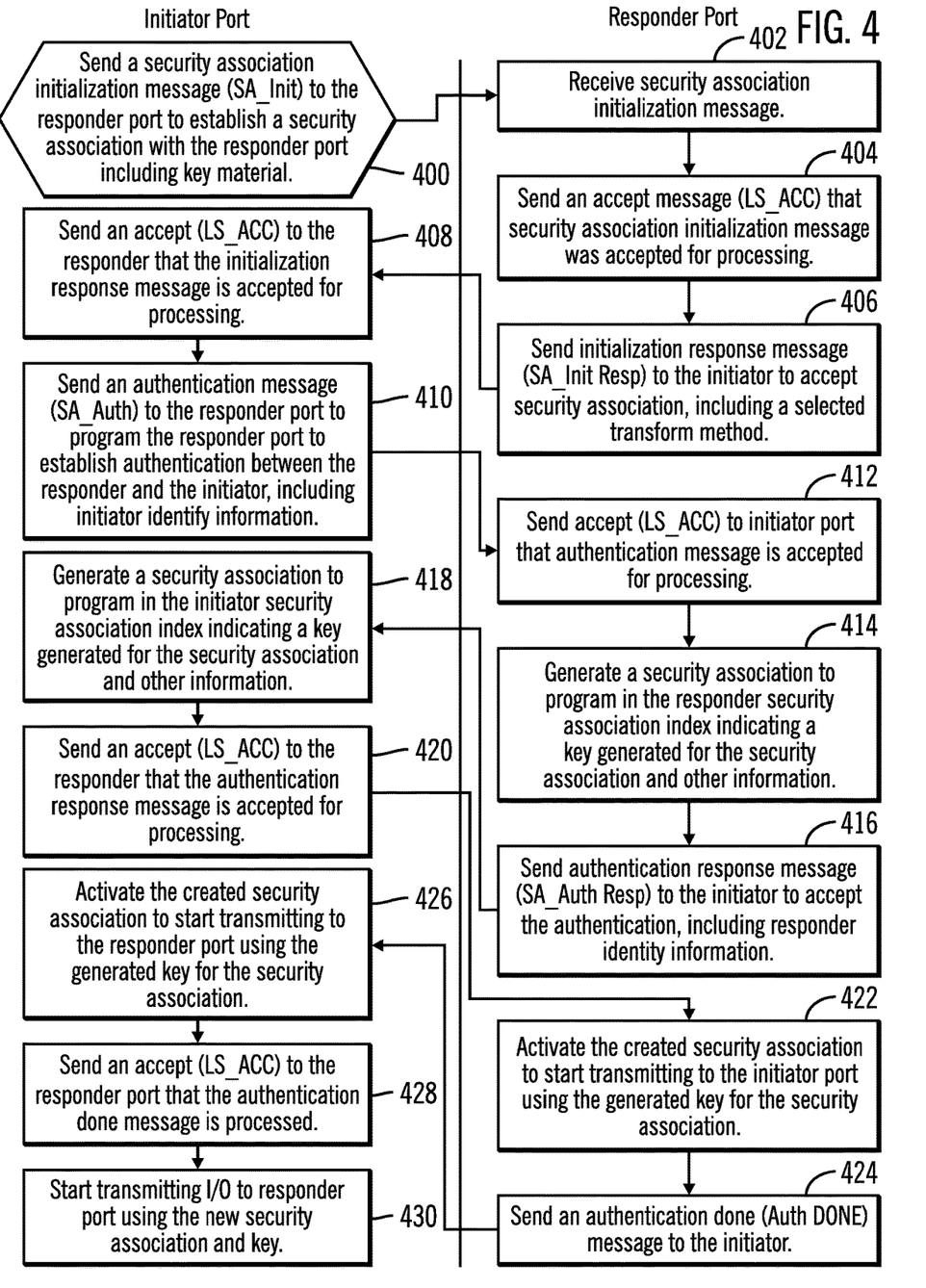
FIG. 4 illustrates an embodiment of operations to establish a security association and authentication between an initiator and responder nodes.

FIG. 4 illustrates an embodiment of operations performed by the security association manager 206 implemented in two HBAs $200_i$, one functioning as an initiator HBA $200_I$ initiating a security association management transaction from an initiator port $210_I$ in the initiator HBA $200_I$ and another functioning as a responder HBA $200_R$ responding to a security association management transaction at a responder port 2108 in the responder HBA $200_R$. In one implementation, the host HBA $200_H$ functions as the initiator and the storage controller HBA $200_{SC}$ functions as a responder. In further embodiments, other combinations of devices may have the HBAs operating as initiator or responder for different ports. To initiate operations to establish a security association $300_i$, the initiator HBA $200_I$ sends (at block 400) a security association initialization message (SA_Init) from the initiator port $210_I$ to the responder port $210_R$ to establish a security association with the responder port $210_R$ including key material used to create a encryption key. Upon receiving (at block 402) the security association initialization message, the responder HBA $200_R$ sends (at block 404) an acceptance of the security association initialization message for processing to the initiator port $210_I$. In Fibre Channel protocol implementations, an accept message indicating processing of a received message may take the form of the link services accept message (LS_ACC). After the accept is sent, the responder HBA $200_R$ sends (at block 406) an initialization response message (SA_Init Resp) to the initiator port $210_I$ to accept the security association, including a selected transform method to use for encryption/decryption. The security association initialization message may include a plurality of different encryption transform methods from which the responder HBA $200_R$ may select to use for the security association $300_i$ being established.

Upon receiving the send initialization response message (SA_Init Resp), the initiator HBA $200_I$ sends (at block 408) an accept (LS_ACC) to the responder port $210_R$ that the initialization response message is accepted for processing and then sends (at block 410) an authentication message (SA_Auth) to the responder port $210_R$ to program the responder port $210_R$ to establish authentication between the responder and the initiator, including initiator identify information. The initiator identity information may comprise a certificate for the entity having the initiator port $210_I$, such as the host $102_i$. Upon receiving the security association authentication message (SA_Auth), the responder HBA $210_R$ sends (at block 412) an accept message (LS_ACC) to the initiator port $210_I$ that the authentication message was accepted for processing and then generates (at block 414) a security association $300_i$, including the key 304 or keys needed to perform decryption and encryption with messages from the initiator port $210_I$, to program in the responder security association index 300 indicating the key generated for the security association $300_i$ and other information. After programming the responder HBA $200_R$ with the security association $300_i$ for the responder port $210_R$, the responder HBA $200_R$ sends (at block 416) an authentication response message (SA_Auth Resp) to the initiator port $210_1$ to accept the authentication, including responder identity information, such as an identity of the entity including the responder HBA $200_R$, such as a storage controller 104.

Upon receiving the security association authentication response message, the initiator HBA $200_I$ generates (at block 418) a security association $300_i$ to program in the initiator security association index 300 to indicate a key 304 generated for the security association $300_i$ and other information. After programming the security association $300_i$ in the initiator index 300, the initiator HBA $200_I$ sends (at block 420) an accept (LS_ACC) to the responder port $210_R$ that the authentication message is accepted for processing. Upon receiving accept, the responder HBA $200_R$ activates (at block 422) the created security association $300_i$, such as by setting the active flag 314 to start transmitting to the initiator port $210_I$ using the generated key 304 for the security association $300_i$. After activating the security association, the responder HBA $200_R$ sends (at block 424) an authentication done message (AUTH Done) to the initiator port $210_I$ indicating that both security association initialization and authentication is completed and transmissions may now be encrypted and decrypted using the key 304 for the newly established security association $300_i$. Upon receiving the authentication done message, the initiator HBA $200_I$ activates (at block 426) the created security association $300_i$, such as by setting the active flag 314 to start transmitting to the responder port $210_R$ using the generated key 304 for the security association $300_i$. After activating the security association, the initiator HBA $200_I$ sends (at block 428) an accept (LS_ACC) to the responder port 220R that the security association $300_i$ is activated and starts transmitting (at block 430) I/O to the responder port $210_R$ using the new security association key 304.

Figure 5:
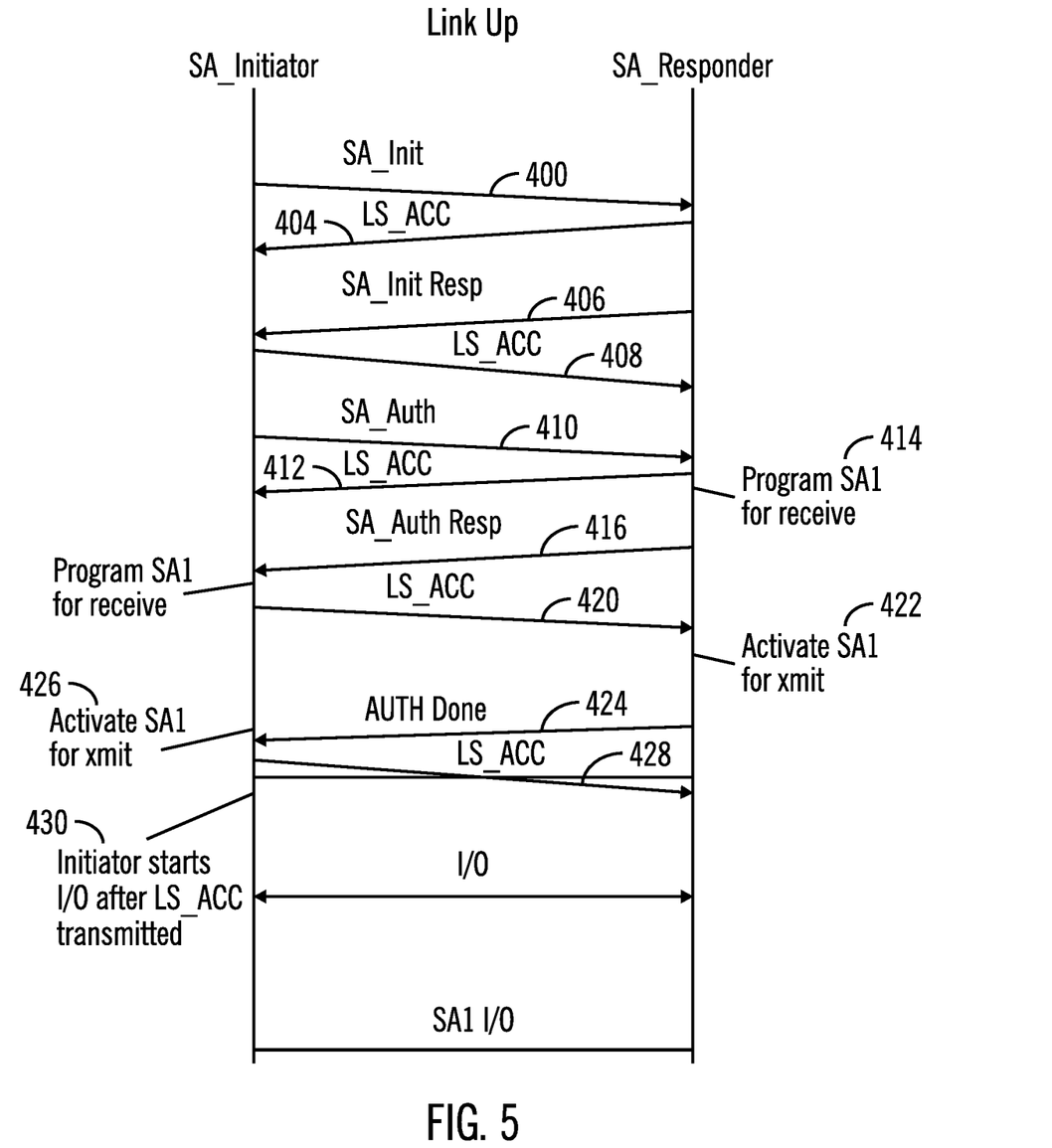
FIG. 5 illustrates a message flow for the operations of FIG. 4.

FIG. 5 provides a timing chart illustrating the flow of the messages in FIG. 4 and timing of operations, with transmissions numbered with corresponding blocks in FIG. 4.

With the embodiment of FIGS. 4 and 5, the responder HBA $200_R$ provides notification that all steps to establish the security association and authentication have completed successfully by sending the authentication done message (at block 424). Once the initiator HBA $200_I$ accepts the authentication done message which occurs after the security association $300_i$ has been programmed at the nodes, then both the initiator and responder nodes can begin transmission with the new security association $300_i$ and key 304. With the authentication done message, the responder signals capability to transmit with the new key 304 and signals the initiator to also begin transmission using the new key 304 of the new security association. In this way, with the described embodiment, the security association management protocol is combined with mutual authentication to allow the initiator and responder to begin secure transmissions using a new security association.

Further, with described embodiments, a host $102_i$ may always function as the initiator in establishing a security association with a storage controller 104 to avoid having to negotiate between nodes the node that will function as the initiator.

Figure 6:
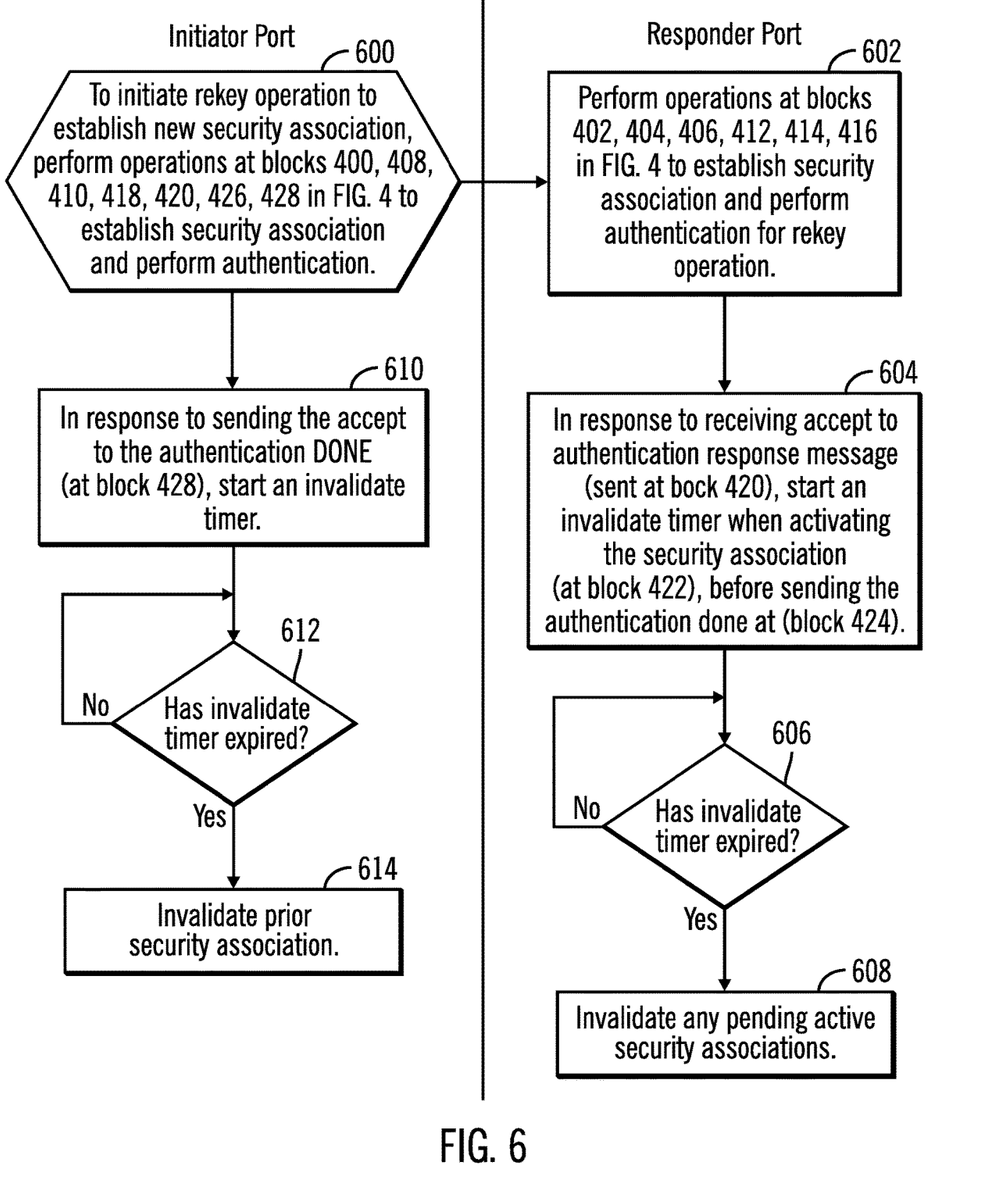
FIG. 6 illustrates an embodiment of operations to perform a rekey operation to generate a new security association and authentication between an initiator and responder nodes and delete the old security association.

FIG. 6 illustrates an embodiment of operations performed between the initiator HBA $200_I$ and the responder HBA $200_R$ to perform a rekey operation to establish a new security association for a new child key to use for future transmissions after an initial security association is established according to the operations of FIGS. 4 and 5. To initiate a rekey operation to create a new security association $300_i$ and key 304, the initiator HBA $200_I$ performs (at block 600) operations at blocks 400, 408, 410, 418, 420, 426, 428 in FIG. 4 to establish security association and perform authentication for the new security association. The responder HBA $200_R$ performs (at block 602) operations at blocks 402, 404, 406, 412, 414, 416 in FIG. 4 to establish a security association $300_i$ and perform authentication for the rekey operation. Upon receiving the accept to the authentication response message, sent by the initiator HBA $200_I$ at block 420, the responder HBA $200_R$ starts (at block 604) an invalidate timer 208 when activating the security association $300_i$ (at block 422), before sending the authentication done at (block 424). Upon the invalidate timer 208 expiring (at block 606), the responder HBA $200_R$ invalidates (at block 608) any pending active security associations $300_{i-1}$. Upon invalidating the prior security association, the responder HBA $200_R$ would only use the new security association $300_i$ created as part of the rekey operation. Further, when the initiator HBA $200_I$ sends the accept to the authentication done (at block 428), it would also start (at block 610) its own invalidate timer 208. Upon expiration (at block 612) of the invalidate timer 208 the prior security association $300_{i-1}$ at the initiator HBA $200_I$ is invalidated (at block 614).

Figure 7:
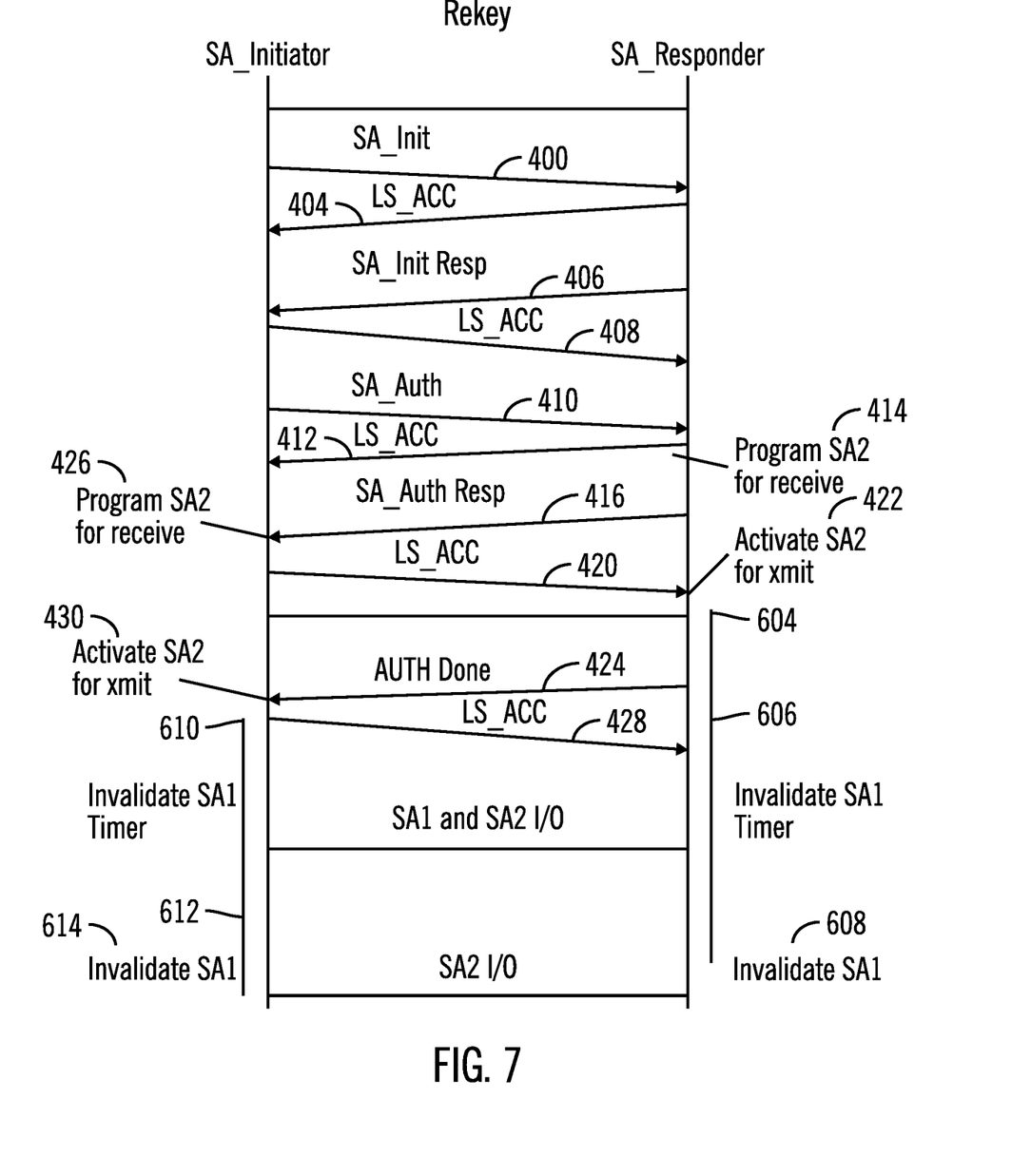
FIG. 7 illustrates a message flow for the operations of FIG. 6.

FIG. 7 provides a timing chart illustrating the flow of the messages in FIG. 6 and timing of the rekey operations, with transmissions numbered with corresponding blocks in FIG. 6. Reference numbers from FIG. 4 shown in FIG. 7 refer to the security association initialization operations of FIG. 4 as performed with respect to the establishment of a second or new security association as described in FIG. 6.

With the embodiment of operations of FIGS. 6 and 7, after completion of the rekey operation, both the initiator port $210_I$ and responder port $210_R$ have begun queuing I/O requests for transmission using the new transmission keys. Moreover, both the initiator and responder start invalidate timers 208 that provide sufficient time to allow the queued I/O requests transmitted using the previous key and security association $300_{i-1}$ to be processed and flushed out of the I/O queue 204 before invalidating the previous security association $300_{i-1}$ needed to process the I/O requests sent before activation of the new keys. In this way, by the time the previous security association $300_{i-1}$ is invalidated, there are likely no more I/O requests in the I/O queue 204 encrypted using the previous security association $300_{i-1}$. Further, in one embodiment, the responder HBA $200_R$ may start the invalidate timer 208 before the initiator HBA $200_I$, because the responder activates the new security association in response to the accept (at block 422) before the imitator activates its new security association in response to the later sent authentication done message (at block 424).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
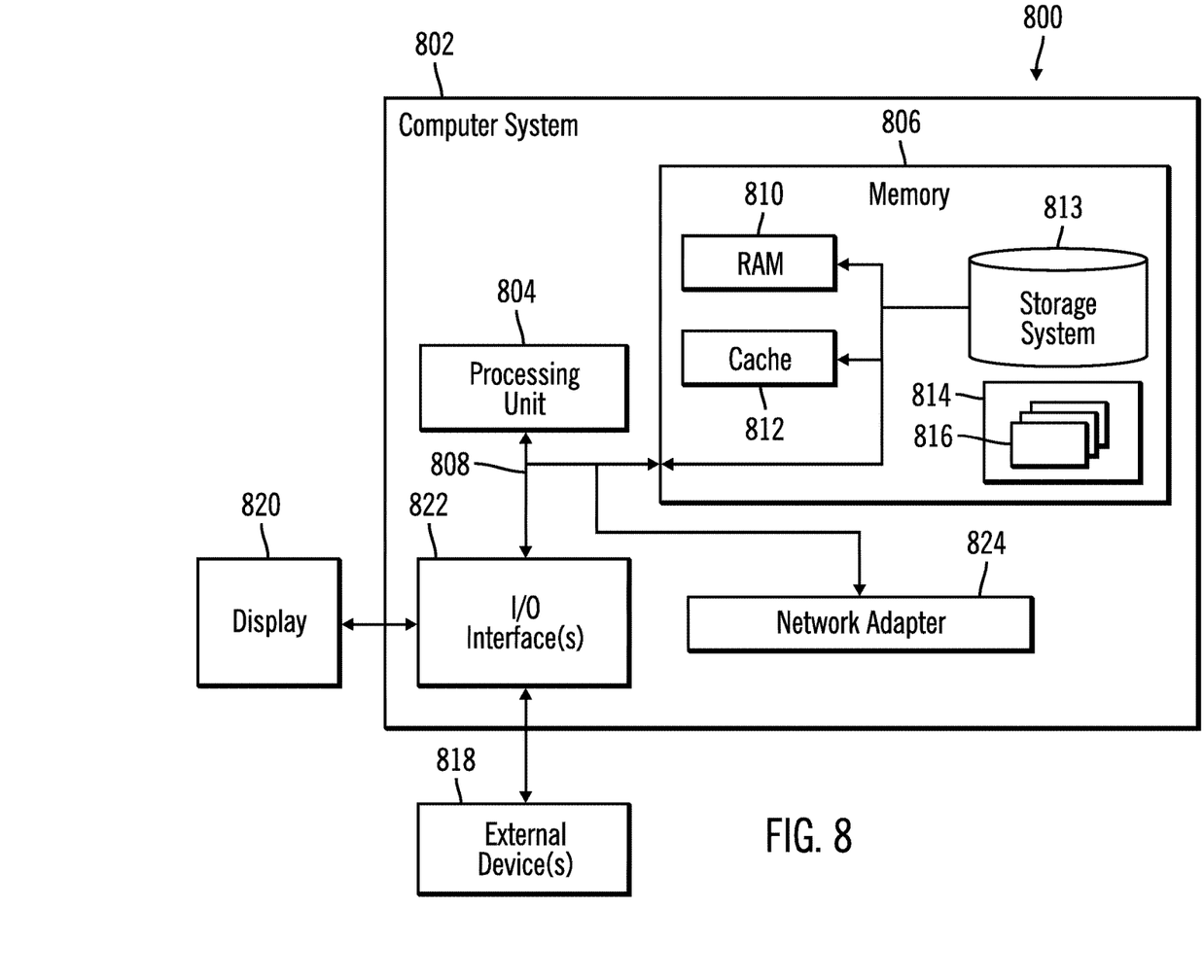
FIG. 8 illustrates a computing environment in which the components of FIG. 1 may be implemented.

The computational components of FIGS. 1 and 2, including the hosts $102_1, 102_2 \ldots 102_n$, storage controller 104, and host bus adaptor $200_i$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for secure communication between an initiator and a responder over a network, the computer program product comprising a computer readable storage medium having computer readable program code implemented at the responder that when executed performs operations, the operations comprising:
   receiving, from the initiator, a security association initialization message to establish a security association with the responder including key material used to generate a key for the security association;
   receiving an authentication message from the initiator to program the responder to establish authentication between the responder and the initiator after establishing the security association;
   sending an authentication message response to the initiator to establish authentication with the responder in response to the authentication message; and
   sending an authentication done message to the initiator after sending the authentication message response to cause the initiator to activate using the security association and the key to encrypt and decrypt communication between the responder and initiator.

2. The computer program product of claim 1, wherein the operations further comprise:
   receiving an accept message from the initiator in response to the authentication done message, wherein the security association and generated key for the security association are activated to use for communication before sending the authentication done message, wherein authentication is established between the initiator and the responder in response to receiving the accept message.

3. The computer program product of claim 2, wherein the accept message comprises a second accept message, wherein the operations further comprise:
   receiving a first accept message from the initiator in response to the authentication message response; and
   activating the security association to use a key for the security association to encrypt and decrypt messages for the initiator in response to the first accept message, wherein the authentication done message is sent after receiving the first accept message.

4. The computer program product of claim 1, wherein the initiator comprises a host system and the responder comprises a storage controller providing the host system access to storage resources, and wherein the security association and authentication are established for an initiator port at the host system and a responder port at the storage controller.

5. A computer program product for secure communication between an initiator and a responder over a network, the computer program product comprising a computer readable storage medium having computer readable program code implemented at the responder that when executed performs operations, the operations comprising:
   maintaining a first security association with the initiator having a first key to use to encrypt and decrypt messages transmitted with the initiator;
   performing a rekey operation to establish a second security association with the initiator using a second key;
   queuing Input/Output (I/O) for transmission using the second key after completing the rekey operation;
   in response to activating the second security association to use for transmission, starting an invalidate timer, wherein both the first and the second keys can be used for transmissions with the initiator before the invalidate timer expires after starting; and
   invalidating the first security association in response to expiration of the invalidate timer.

6. The computer program product of claim 5, wherein the operations further comprise:
   receiving a security association initialization message from the initiator to accept the second security association, including key material used to generate the second key for the second security association;
   receiving an authentication message from the initiator to establish authentication between the responder and the initiator after the security association initialization message; and
   sending an authentication response message to the initiator after authenticating the initiator in response to the authentication message.

7. The computer program product of claim 6, wherein the operations further comprise:
   sending an authentication done message to the initiator after sending the authentication response message, wherein the authentication done message causes the initiator to activate the second security association to use the second key to encrypt and decrypt communication and to start an invalidate timer at the initiator to invalidate the first security association at the initiator in response to expiration of the invalidate timer at the initiator.

8. The computer program product of claim 6, wherein the operations further comprise:
   programing the second security association at the responder in response to the authentication message from the initiator, wherein the authentication response message is sent to the initiator after programming the second security association at the responder.

9. The computer program product of claim 6, wherein the operations further comprise:
   sending an authentication message response to the initiator including a responder identity in response to the authentication message received from the initiator; and
   receiving an accept message from the initiator in response to the authentication message response; and
   in response to the accept message, activating the second security association to use for transmissions and activate an invalidate timer at the responder to invalidate the first security association in response to the invalidate timer expiring.

10. The computer program product of claim 9, wherein an invalidate timer for the initiator is started after the invalidate timer for the responder is started.

11. A system for secure communication between an initiator and a responder over a network, comprising:
    a processor:
    a computer readable storage medium having computer readable program code implemented at the responder that when executed performs operations, the operations comprising:
       receiving, from the initiator, a security association initialization message to establish a security association with the responder including key material used to generate a key for the security association;
       receiving an authentication message from the initiator to program the responder to establish authentication between the responder and the initiator after establishing the security association;

sending an authentication message response to the initiator to establish authentication with the responder in response to the authentication message; and sending an authentication done message to the initiator after sending the authentication message response to cause the initiator to activate using the security association and the key to encrypt and decrypt communication between the responder and initiator.

12. The system of claim 11, wherein the operations further comprise:
receiving an accept message from the initiator in response to the authentication done message, wherein the security association and generated key for the security association are activated to use for communication before sending the authentication done message, wherein authentication is established between the initiator and the responder in response to receiving the accept message.

13. The system of claim 12, wherein the accept message comprises a second accept message, wherein the operations further comprise:
receiving a first accept message from the initiator in response to the authentication message response; and
activating the security association to use a key for the security association to encrypt and decrypt messages for the initiator in response to the first accept message, wherein the authentication done message is sent after receiving the first accept message.

14. The system of claim 11, wherein the initiator comprises a host system and the responder comprises a storage controller providing the host system access to storage resources, and wherein the security association and authentication are established for an initiator port at the host system and a responder port at the storage controller.

15. A system for secure communication between an initiator and a responder over a network, comprising:
a processor:
a computer readable storage medium having computer readable program code implemented at the responder that when executed performs operations, the operations comprising:
maintaining a first security association with the initiator having a first key to use to encrypt and decrypt messages transmitted with the initiator;
performing a rekey operation to establish a second security association with the initiator using a second key;
queuing Input/Output (I/O) for transmission using the second key after completing the rekey operation;
in response to activating the second security association to use for transmission, starting an invalidate timer, wherein both the first and the second keys can be used for transmissions with the initiator before the invalidate timer expires after starting; and
invalidating the first security association in response to expiration of the invalidate timer.

16. The system of claim 15, wherein the operations further comprise:
receiving a security association initialization message from the initiator to accept the second security association, including key material used to generate the second key for the second security association;
receiving an authentication message from the initiator to establish authentication between the responder and the initiator after the security association initialization message; and sending an authentication response message to the initiator after authenticating the initiator in response to the authentication message.

17. The system of claim 16, wherein the operations further comprise:
sending an authentication done message to the initiator after sending the authentication response message, wherein the authentication done message causes the initiator to activate the second security association to use the second key to encrypt and decrypt communication and to start an invalidate timer at the initiator to invalidate the first security association at the initiator in response to expiration of the invalidate timer at the initiator.

18. The system of claim 16, wherein the operations further comprise:
programing the second security association at the responder in response to the authentication message from the initiator, wherein the authentication response message is sent to the initiator after programming the second security association at the responder.

19. The system of claim 16, wherein the operations further comprise:
sending an authentication message response to the initiator including a responder identity in response to the authentication message received from the initiator; and
receiving an accept message from the initiator in response to the authentication message response; and
in response to the accept message, activating the second security association to use for transmissions and activate an invalidate timer at the responder to invalidate the first security association in response to the invalidate timer expiring.

20. The system of claim 19, wherein an invalidate timer for the initiator is started after the invalidate timer for the responder is started.

21. A method for secure communication between an initiator and a responder over a network, comprising:
maintaining, by the responder, a first security association with the initiator having a first key to use to encrypt and decrypt messages transmitted with the initiator;
performing, by the responder, a rekey operation to establish a second security association with the initiator using a second key;
queuing, by the responder, Input/Output (I/O) for transmission using the second key after completing the rekey operation;
in response to activating the second security association to use for transmission, starting, by the responder, an invalidate timer, wherein both the first and the second keys can be used for transmissions with the initiator before the invalidate timer expires after starting; and
invalidating, by the responder, the first security association in response to expiration of the invalidate timer.

22. The method of claim 21, further comprising:
receiving, by the responder, a security association initialization message from the initiator to accept the second security association, including key material used to generate the second key for the second security association;
receiving, by the responder, an authentication message from the initiator to establish authentication between the responder and the initiator after the security association initialization message; and
sending, by the responder, an authentication response message to the initiator after authenticating the initiator in response to the authentication message.

23. The method of claim 22, further comprising:
sending, by the responder, an authentication done message to the initiator after sending the authentication response message, wherein the authentication done message causes the initiator to activate the second security association to use the second key to encrypt and decrypt communication and to start an invalidate timer at the initiator to invalidate the first security association at the initiator in response to expiration of the invalidate timer at the initiator.

24. The method of claim 22, further comprising:
programing, by the responder, the second security association at the responder in response to the authentication message from the initiator, wherein the authentication response message is sent to the initiator after programming the second security association at the responder.

25. The method of claim 22, further comprising:
sending, by the responder, an authentication message response to the initiator including a responder identity in response to the authentication message received from the initiator; and receiving, by the responder, an accept message from the initiator in response to the authentication message response; and in response to the accept message, activating, by the responder, the second security association to use for transmissions and activate an invalidate timer at the responder to invalidate the first security association in response to the invalidate timer expiring.

* * * * *